United States Patent
Dunn et al.

(10) Patent No.: US 10,466,539 B2
(45) Date of Patent: Nov. 5, 2019

(54) AIRGUIDE BACKLIGHT ASSEMBLY

(71) Applicant: Manufacturing Resources International, Inc., Alpharetta, GA (US)

(72) Inventors: William Dunn, Alpharetta, GA (US); Harry Presley, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 186 days.

(21) Appl. No.: 15/594,277

(22) Filed: May 12, 2017

(65) Prior Publication Data

US 2017/0248823 A1    Aug. 31, 2017

Related U.S. Application Data

(63) Continuation of application No. 14/322,962, filed on Jul. 3, 2014, now Pat. No. 9,690,137.

(60) Provisional application No. 61/842,704, filed on Jul. 3, 2013.

(51) Int. Cl.
  *F21V 8/00* (2006.01)
  *G02F 1/1335* (2006.01)

(52) U.S. Cl.
  CPC ....... *G02F 1/133615* (2013.01); *G02B 6/003* (2013.01); *G02B 6/0031* (2013.01); *G02B 6/0051* (2013.01); *G02B 6/0096* (2013.01)

(58) Field of Classification Search
  CPC .... G02B 6/003; G02B 6/0051; G02B 6/0031; G02B 6/0096; G02F 1/133615
  See application file for complete search history.

(56) References Cited

U.S. PATENT DOCUMENTS

| | | |
|---|---|---|
| 1,812,919 A | 7/1931 | Balder |
| 3,510,973 A | 5/1970 | Mazzocco, Sr. |
| 4,257,084 A | 3/1981 | Reynolds |
| 4,804,953 A | 2/1989 | Castleberry |
| 5,040,878 A | 8/1991 | Eichenlaub |
| 5,046,805 A | 9/1991 | Simon |
| 5,066,106 A | 11/1991 | Sakamoto et al. |

(Continued)

FOREIGN PATENT DOCUMENTS

| AU | 2004283319 A1 | 5/2005 |
|---|---|---|
| AU | 2007216782 A1 | 9/2007 |

(Continued)

OTHER PUBLICATIONS

Wikipedia, Gradient-index optics, 2016.

(Continued)

*Primary Examiner* — Phu Vu
(74) *Attorney, Agent, or Firm* — Standley Law Group LLP; Jeffrey S. Standley; Adam J. Smith (57) ABSTRACT

The exemplary embodiments herein provide an airguide backlight assembly having an anterior element, a reflective pan positioned posterior to the anterior element, and a light source positioned to direct light towards the reflective pan. A lens element may be placed in front of each light source. The reflective pan preferably contains a slope or curve so that light emitted from the light sources can be reflected and/or refracted to distribute the light uniformly to the anterior element. In some embodiments, blinders may be positioned between the light sources and the anterior element as well as between the light sources and the reflective pan.

20 Claims, 9 Drawing Sheets

(56) References Cited

U.S. PATENT DOCUMENTS

| | | |
|---|---|---|
| 5,363,149 A | 11/1994 | Furuno et al. |
| 5,440,324 A | 8/1995 | Strickling, III et al. |
| 5,453,855 A | 9/1995 | Nakamura et al. |
| 5,528,720 A | 6/1996 | Winston et al. |
| 5,598,068 A | 1/1997 | Shirai |
| 5,661,578 A | 8/1997 | Habing et al. |
| 5,856,854 A | 1/1999 | Hyun |
| 6,027,222 A | 2/2000 | Oki et al. |
| 6,166,389 A | 12/2000 | Shie et al. |
| 6,307,216 B1 | 10/2001 | Huh et al. |
| 6,400,101 B1 | 6/2002 | Biebl et al. |
| 6,419,372 B1 | 7/2002 | Shaw et al. |
| 6,421,103 B2 | 7/2002 | Yamaguchi |
| 6,481,130 B1 | 11/2002 | Wu |
| 6,601,984 B2 | 8/2003 | Yamamoto et al. |
| 6,636,003 B2 | 10/2003 | Rahm et al. |
| 6,762,815 B2 | 7/2004 | Lee |
| 6,789,921 B1 | 9/2004 | Deloy et al. |
| 6,805,468 B2 | 10/2004 | Itoh et al. |
| 6,842,204 B1 | 1/2005 | Johnson |
| 6,860,628 B2 | 3/2005 | Robertson et al. |
| 6,936,968 B2 | 8/2005 | Cross et al. |
| 6,949,772 B2 | 9/2005 | Shimizu et al. |
| 6,958,743 B2 | 10/2005 | Shin et al. |
| 7,012,379 B1 | 3/2006 | Chambers et al. |
| 7,015,650 B2 | 3/2006 | McGrath |
| 7,018,054 B2 | 3/2006 | Miyashita et al. |
| 7,025,474 B2 | 4/2006 | Campbell et al. |
| 7,038,186 B2 | 5/2006 | De Brabander et al. |
| 7,040,794 B2 | 5/2006 | Bernard |
| 7,045,828 B2 | 5/2006 | Shimizu et al. |
| 7,049,761 B2 | 5/2006 | Timmermans et al. |
| 7,053,557 B2 | 5/2006 | Cross et al. |
| 7,057,590 B2 | 6/2006 | Lim et al. |
| 7,218,812 B2 | 5/2007 | Maxwell et al. |
| 7,250,637 B2 | 7/2007 | Shimizu et al. |
| 7,259,403 B2 | 8/2007 | Shimizu et al. |
| 7,307,391 B2 | 12/2007 | Shan |
| 7,307,614 B2 | 12/2007 | Vinn |
| 7,347,706 B1 | 3/2008 | Wu et al. |
| 7,352,940 B2 | 4/2008 | Charters et al. |
| 7,375,381 B2 | 5/2008 | Shimizu et al. |
| 7,421,167 B2 | 9/2008 | Charters et al. |
| 7,473,019 B2 | 1/2009 | Laski |
| 7,481,553 B2 | 1/2009 | Kim et al. |
| 7,481,566 B2 | 1/2009 | Han |
| 7,510,299 B2 | 3/2009 | Timmermans et al. |
| 7,513,637 B2 | 4/2009 | Kelly et al. |
| 7,546,009 B2 | 6/2009 | Kukulj et al. |
| 7,738,746 B2 | 6/2010 | Charters et al. |
| 7,781,979 B2 | 8/2010 | Lys |
| 7,795,574 B2 | 9/2010 | Kennedy et al. |
| 7,813,694 B2 | 10/2010 | Fishman et al. |
| 7,982,706 B2 | 7/2011 | Ichikawa et al. |
| 8,021,900 B2 | 9/2011 | Maxwell et al. |
| 8,064,744 B2 | 11/2011 | Atkins et al. |
| 8,120,595 B2 | 2/2012 | Kukulj et al. |
| 8,194,031 B2 | 6/2012 | Yao et al. |
| 8,233,115 B2 | 7/2012 | Hadlich et al. |
| 8,274,626 B2 | 9/2012 | Choi et al. |
| 8,294,168 B2 | 10/2012 | Park et al. |
| 8,351,013 B2 | 1/2013 | Dunn et al. |
| 8,400,430 B2 | 3/2013 | Dunn et al. |
| 8,529,993 B2 | 9/2013 | Charters et al. |
| 8,648,993 B2 | 2/2014 | Dunn et al. |
| 8,674,390 B2 | 3/2014 | Harris et al. |
| 8,674,963 B2 | 3/2014 | Cornish et al. |
| 8,803,790 B2 | 8/2014 | Wasinger et al. |
| 8,842,366 B2 | 9/2014 | Arnett et al. |
| 9,348,174 B2 | 5/2016 | Dunn et al. |
| 2001/0009508 A1 | 7/2001 | Umemoto et al. |
| 2001/0033726 A1 | 10/2001 | Shie et al. |
| 2002/0043012 A1 | 4/2002 | Shibata et al. |
| 2002/0126078 A1 | 9/2002 | Horibe et al. |
| 2003/0026085 A1 | 2/2003 | Ueda et al. |
| 2003/0227428 A1 | 12/2003 | Nose |
| 2004/0062029 A1 | 4/2004 | Ato |
| 2004/0113044 A1 | 6/2004 | Ishiguchi |
| 2005/0094391 A1 | 5/2005 | Campbell et al. |
| 2005/0117323 A1 | 6/2005 | King |
| 2005/0140848 A1 | 6/2005 | Yoo et al. |
| 2005/0162737 A1 | 7/2005 | Whitehead et al. |
| 2005/0265019 A1 | 12/2005 | Sommers et al. |
| 2006/0012985 A1 | 1/2006 | Archie, Jr. et al. |
| 2006/0055012 A1 | 3/2006 | Hsin Chen et al. |
| 2006/0082700 A1 | 4/2006 | Gehlsen et al. |
| 2006/0087521 A1 | 4/2006 | Chu et al. |
| 2006/0092346 A1 | 5/2006 | Moon et al. |
| 2006/0092348 A1 | 5/2006 | Park |
| 2006/0125418 A1 | 6/2006 | Bourgault |
| 2006/0197474 A1 | 9/2006 | Olsen |
| 2006/0221612 A1 | 10/2006 | Song et al. |
| 2006/0238367 A1 | 10/2006 | Tsuchiya |
| 2006/0262079 A1 | 11/2006 | Seong et al. |
| 2006/0279946 A1 | 12/2006 | Park et al. |
| 2006/0289201 A1 | 12/2006 | Kim et al. |
| 2007/0013828 A1 | 1/2007 | Cho et al. |
| 2007/0097321 A1 | 5/2007 | Whitehead et al. |
| 2007/0115686 A1 | 5/2007 | Tyberghien |
| 2007/0139574 A1 | 6/2007 | Ko et al. |
| 2007/0139929 A1 | 6/2007 | Yoo et al. |
| 2007/0147037 A1 | 6/2007 | Wang |
| 2007/0153515 A1 | 7/2007 | Hong et al. |
| 2007/0171353 A1 | 7/2007 | Hong |
| 2007/0171623 A1 | 7/2007 | Zagar et al. |
| 2007/0195535 A1 | 8/2007 | Artwohl et al. |
| 2007/0206158 A1 | 9/2007 | Kinoshita et al. |
| 2007/0230218 A1 | 10/2007 | Jachim et al. |
| 2007/0268234 A1 | 11/2007 | Wakabayashi et al. |
| 2007/0297163 A1 | 12/2007 | Kim et al. |
| 2008/0036940 A1 | 2/2008 | Song et al. |
| 2008/0043463 A1 | 2/2008 | Park et al. |
| 2008/0049164 A1 | 2/2008 | Jeon et al. |
| 2008/0068836 A1 | 3/2008 | Hatanaka et al. |
| 2008/0089064 A1 | 4/2008 | Wang |
| 2008/0101086 A1 | 5/2008 | Lee |
| 2008/0106527 A1 | 5/2008 | Cornish et al. |
| 2008/0111949 A1 | 5/2008 | Shibata et al. |
| 2008/0143916 A1 | 6/2008 | Fujino et al. |
| 2008/0151527 A1 | 6/2008 | Ueno et al. |
| 2008/0170178 A1 | 7/2008 | Kubota et al. |
| 2008/0170400 A1 | 7/2008 | Maruyama |
| 2008/0212305 A1 | 9/2008 | Kawana et al. |
| 2008/0231196 A1 | 9/2008 | Weng et al. |
| 2008/0276507 A1 | 11/2008 | Hines |
| 2008/0284942 A1 | 11/2008 | Mahama et al. |
| 2009/0002990 A1 | 1/2009 | Becker et al. |
| 2009/0009102 A1 | 1/2009 | Kahlman et al. |
| 2009/0015755 A1 | 1/2009 | Bang et al. |
| 2009/0033612 A1 | 2/2009 | Roberts et al. |
| 2009/0058795 A1 | 3/2009 | Yamazaki |
| 2009/0085859 A1 | 4/2009 | Song |
| 2009/0091634 A1 | 4/2009 | Kennedy et al. |
| 2009/0135167 A1 | 5/2009 | Sakai et al. |
| 2009/0135583 A1 | 5/2009 | Hillman et al. |
| 2009/0174840 A1 | 7/2009 | Lee et al. |
| 2009/0196069 A1 | 8/2009 | Iwasaki |
| 2009/0243501 A1 | 10/2009 | Dunn et al. |
| 2010/0102735 A1 | 4/2010 | Chang et al. |
| 2010/0109553 A1 | 5/2010 | Chang et al. |
| 2010/0165240 A1 | 7/2010 | Cho et al. |
| 2010/0194296 A1 | 8/2010 | Park |
| 2010/0220258 A1 | 9/2010 | Dunn et al. |
| 2010/0307800 A1 | 12/2010 | Wee et al. |
| 2011/0007228 A1 | 1/2011 | Yoon et al. |
| 2011/0083460 A1 | 4/2011 | Thomas et al. |
| 2011/0102704 A1 | 5/2011 | Dunn et al. |
| 2011/0116000 A1 | 5/2011 | Dunn et al. |
| 2011/0141724 A1 | 6/2011 | Erion |
| 2011/0164434 A1 | 7/2011 | Derichs |
| 2011/0205145 A1 | 8/2011 | Lin et al. |
| 2011/0242437 A1 | 10/2011 | Yoo et al. |
| 2011/0242839 A1 | 10/2011 | Dunn et al. |
| 2012/0050958 A1 | 3/2012 | Sanford et al. |

(56) References Cited

U.S. PATENT DOCUMENTS

| | | |
|---|---|---|
| 2012/0062819 A1 | 3/2012 | Dunn et al. |
| 2012/0098794 A1 | 4/2012 | Kleinert et al. |
| 2012/0134139 A1 | 5/2012 | Jang et al. |
| 2012/0242926 A1 | 9/2012 | Hsu et al. |
| 2012/0250329 A1 | 10/2012 | Suehiro et al. |
| 2012/0274882 A1 | 11/2012 | Jung |
| 2012/0314447 A1 | 12/2012 | Huang |
| 2012/0327039 A1 | 12/2012 | Kukulj |
| 2013/0016296 A1 | 1/2013 | Fujita et al. |
| 2013/0027633 A1 | 1/2013 | Park et al. |
| 2013/0094160 A1 | 4/2013 | Narumi |
| 2013/0163277 A1 | 6/2013 | Kim et al. |
| 2013/0258659 A1 | 10/2013 | Erion |
| 2013/0278868 A1 | 10/2013 | Dunn et al. |
| 2014/0016355 A1 | 1/2014 | Ajichi |
| 2014/0085564 A1 | 3/2014 | Hendren et al. |
| 2014/0104538 A1 | 4/2014 | Park et al. |
| 2014/0134767 A1 | 5/2014 | Ishida et al. |
| 2014/0268657 A1 | 9/2014 | Dunn et al. |
| 2014/0361969 A1 | 12/2014 | Wasinger et al. |
| 2015/0009653 A1 | 1/2015 | Dunn et al. |
| 2015/0153506 A1 | 6/2015 | Dunn |
| 2015/0219954 A1 | 8/2015 | Kubo |
| 2015/0226996 A1 | 8/2015 | Ohashi |
| 2015/0346525 A1 | 12/2015 | Wolf et al. |
| 2016/0103275 A1 | 4/2016 | Diaz et al. |
| 2016/0238876 A1 | 8/2016 | Dunn et al. |
| 2017/0059938 A1 | 3/2017 | Brown et al. |
| 2017/0248823 A1 | 8/2017 | Dunn et al. |

FOREIGN PATENT DOCUMENTS

| | | |
|---|---|---|
| CA | 2536130 A1 | 5/2005 |
| CA | 2688214 A1 | 11/2008 |
| CN | 1836179 A | 9/2006 |
| CN | 101432647 B | 5/2007 |
| CN | 101048685 A | 10/2007 |
| CN | 101339272 A | 1/2009 |
| CN | 101351765 A | 1/2009 |
| CN | 101681222 A | 3/2010 |
| EP | 0313331 | 4/1989 |
| EP | 1678534 A1 | 7/2006 |
| EP | 1805539 A1 | 7/2007 |
| EP | 2156276 A4 | 5/2008 |
| EP | 1941342 A1 | 7/2008 |
| IN | 30/2007 | 2/2006 |
| IN | 03/2009 | 5/2008 |
| IN | 15/2010 | 12/2009 |
| JP | 11095214 A | 4/1999 |
| JP | 2002064842 | 2/2002 |
| JP | 2002209230 | 7/2002 |
| JP | 2004004581 A | 1/2004 |
| JP | 2007509372 B2 | 10/2004 |
| JP | 2005228996 A | 8/2005 |
| JP | 2005236469 | 9/2005 |
| JP | 2008518251 A | 10/2005 |
| JP | 2007080872 A | 3/2007 |
| JP | 2009535723 A5 | 5/2007 |
| JP | 2008112719 A | 5/2008 |
| JP | 2008256819 A | 10/2008 |
| JP | 2009036964 A | 2/2009 |
| JP | 2009512898 A | 3/2009 |
| JP | 2009231473 A | 10/2009 |
| JP | 2010509622 A | 3/2010 |
| JP | 2010527100 A | 8/2010 |
| JP | 2011081424 A | 4/2011 |
| KR | 1020070003755 A | 2/2006 |
| KR | 1020070084554 A | 5/2007 |
| KR | 20080013592 A | 2/2008 |
| KR | 20080063414 A | 7/2008 |
| KR | 20080074972 A | 8/2008 |
| KR | 1020090007776 A | 1/2009 |
| KR | 20100019997 A | 2/2010 |
| KR | 1020050033986 A | 4/2014 |
| TW | 200615598 A | 5/2006 |
| TW | 200802054 A | 1/2008 |
| TW | 200808925 A | 2/2008 |
| TW | 200809285 A | 2/2008 |
| TW | 200809287 A | 2/2008 |
| TW | 200828093 A | 7/2008 |
| TW | 200912200 A | 3/2009 |
| TW | 201030376 A | 8/2010 |
| TW | 201038114 A | 10/2010 |
| WO | WO9608892 | 3/1996 |
| WO | WO2005051054 A2 | 6/2005 |
| WO | WO2006001559 A1 | 1/2006 |
| WO | WO2006109237 A1 | 10/2006 |
| WO | WO2007052777 A1 | 5/2007 |
| WO | WO2005040873 A1 | 5/2008 |
| WO | WO2008138049 A | 11/2008 |
| WO | WO2009004574 A1 | 1/2009 |
| WO | WO2010080624 | 7/2010 |
| WO | WO2010129271 A2 | 11/2010 |
| WO | WO2011100429 A2 | 8/2011 |
| WO | WO2011143719 | 11/2011 |
| WO | WO2014158642 A1 | 10/2014 |
| WO | WO2015003130 A1 | 1/2015 |

OTHER PUBLICATIONS

Patrick Frantz & Deania Fernandez, Printed Circuit Boards (PCBs), Feb. 18, 2004, 2 Pages, Version 1.1.
Teravision Corp., LCD-TV Panel Control Board Specification, Nov. 2007, 24 Pages.
Supertex Inc., Constant Off-time, Buck-based LED Drivers Using HV9910, Nov. 2, 2004, 4 Pages.
Grin Tech, Grin Lenses, Aug. 25, 2016, 4 Pages.
Supertex Inc., Universal High Brightness LED Driver, 2007, 8 Pages.
Shigeru Aoyama, Akihiro Funamoto & Koichi Imanaka, Hybrid normal-reverse prism coupler for light-emitting diode backlight systems, Oct. 1, 2006, 6 Pages, vol. 45, No. 28.
Panel-Brite, Inc., High Brightness LED Backlight Technology, Mar. 11, 2009, 1 Page.
RPO, How Digital Waveguide Touch Works, Sep. 15, 2011, 1 Page.
Dave Roos, How Transmissive Film Works, article, 2008, 9 pages.
Schott, Glass made of Ideas—OPALIKA, 2016, 2 pages.

AIRGUIDE BACKLIGHT ASSEMBLY

CROSS-REFERENCE TO RELATED APPLICATIONS

This application is a continuation of U.S. patent application Ser. No. 14/322,962 filed on Jul. 3, 2014, which claims priority to U.S. Provisional Patent Application No. 61/842,704 filed on Jul. 3, 2013, both of which are hereby incorporated by reference as if fully recited herein.

TECHNICAL FIELD

Embodiments generally relate to backlight assemblies.

BACKGROUND OF THE ART

Backlight assemblies are used in a number of different applications, ranging from dynamic electronic displays (ex. liquid crystal displays) to static backlight displays (ex. a backlight positioned behind a poster or static graphic). Typically, for edge-lit assemblies (where the light source is placed around the outside edges of the assembly) a light guide is used to capture the light, homogenize, and out-couple the light from the light sources.

SUMMARY OF THE EXEMPLARY EMBODIMENTS

Exemplary embodiments provide a backlight assembly using only air as the light guide ('airguide') where a lens is used to capture the light and a pan is used to homogenize and out-couple the light. The pan can have constant reflectivity, or reflectivity which changes based on the location within the pan. The pan can have features, including ramps, cylindrical curves, sinusoidal curves, arbitrarily optimized curves, or a hybrid of any of these shapes in order to homogenize and out-couple the light. In some embodiments, blinders may be positioned above and below the light sources to further control the emission and distribution of light.

The various embodiments of the airguide backlight assembly described herein can be used with any device that requires a backlight, including but not limited to LCD displays and static displays. The light sources used with any of the embodiments herein can be any device for generating photons, including fluorescent tubes, LEDs, organic LEDs, or light emitting polymers.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
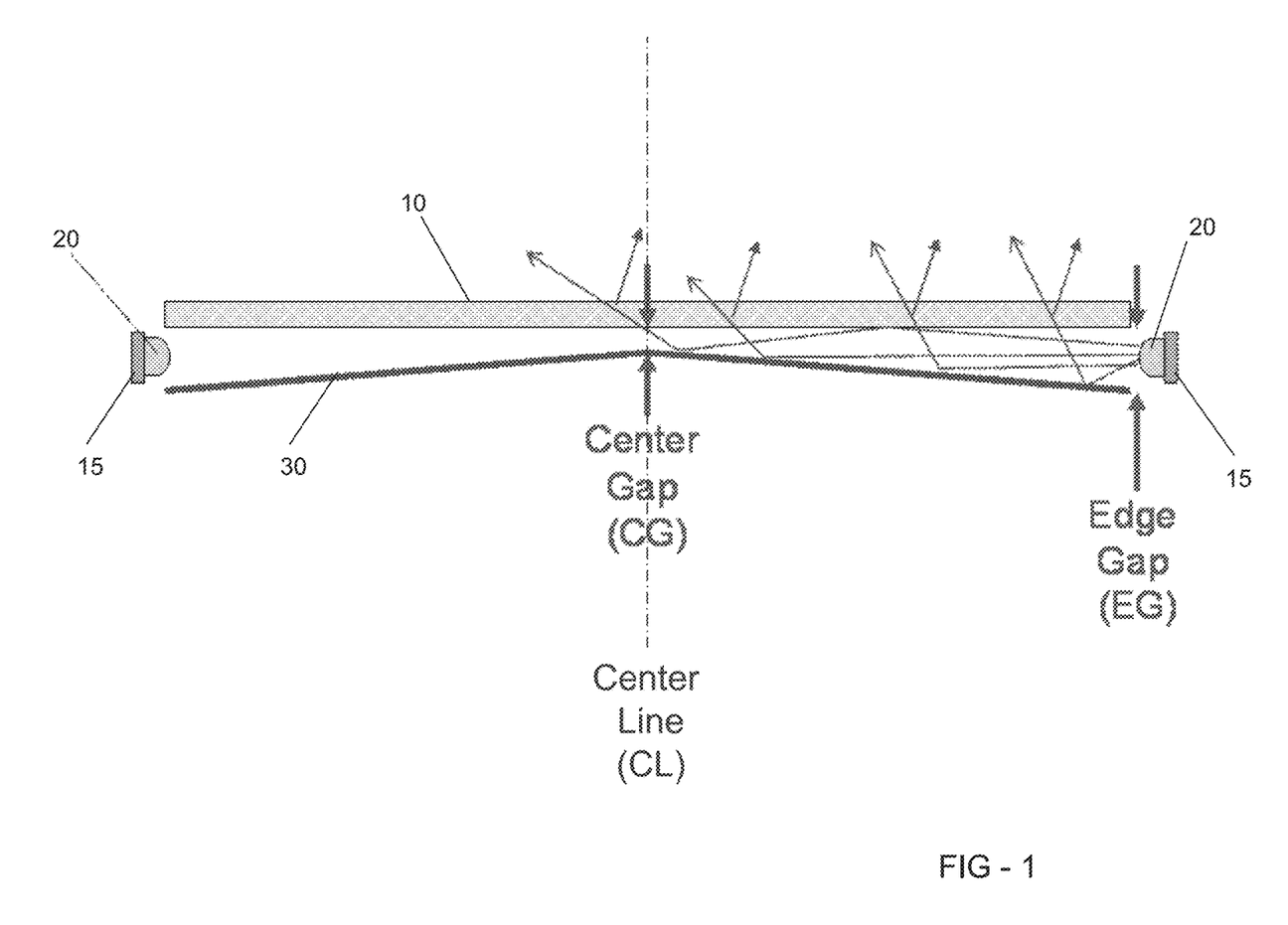
FIG. 1 is a side elevation view of an exemplary embodiment of an airguide backlight assembly.

FIG. 1 is a side elevation view of an exemplary embodiment of an airguide backlight assembly. An anterior element 10 may be positioned at the front portion of the assembly (i.e. the anterior side of the backlight assembly that would face an intended observer) and may include any one or a combination of the following: clear or frosted glass or plastic, a diffusing element, brightness enhancing films, anti-reflective films, liquid crystal cells, posters/static graphics, etc. Preferably, the anterior element 10 is at least semi-transparent. The light source 15 is positioned along the edge of the assembly, preferably with another light source 15 on the opposing side. A lens 20 is preferably positioned in front of the light source 15 and may be used to at least partially collimate the light.

There are no practical limits on the type of lens that may be used with the embodiments herein, assuming that a lens is required for the chosen light source. This may include convex-convex, plano-convex, cylindrical rods, gradient-index, and Fresnel lens.

A reflective pan 30 is positioned behind the anterior element 10 and within the path of the light passing through the lens 20. In this embodiment, the reflective pan 30 has a simple ramp design where two primary variables control the performance of the reflective pan 30: a Center Gap (CG) and an Edge Gap (EG). The Center Gap (CG) may be defined as the distance from the pan 30 to the rear surface of the anterior element 10, when measured along the Centerline (CL). The Edge Gap (EG) may be defined as the distance from the pan 30 to the rear surface of the anterior element 10, when measured at the edge of the pan 30 and anterior element 10 where the light source 15 is positioned. By way of example, the CG distance is often on the order of 60-90% of the EG distance.

Figure 2:
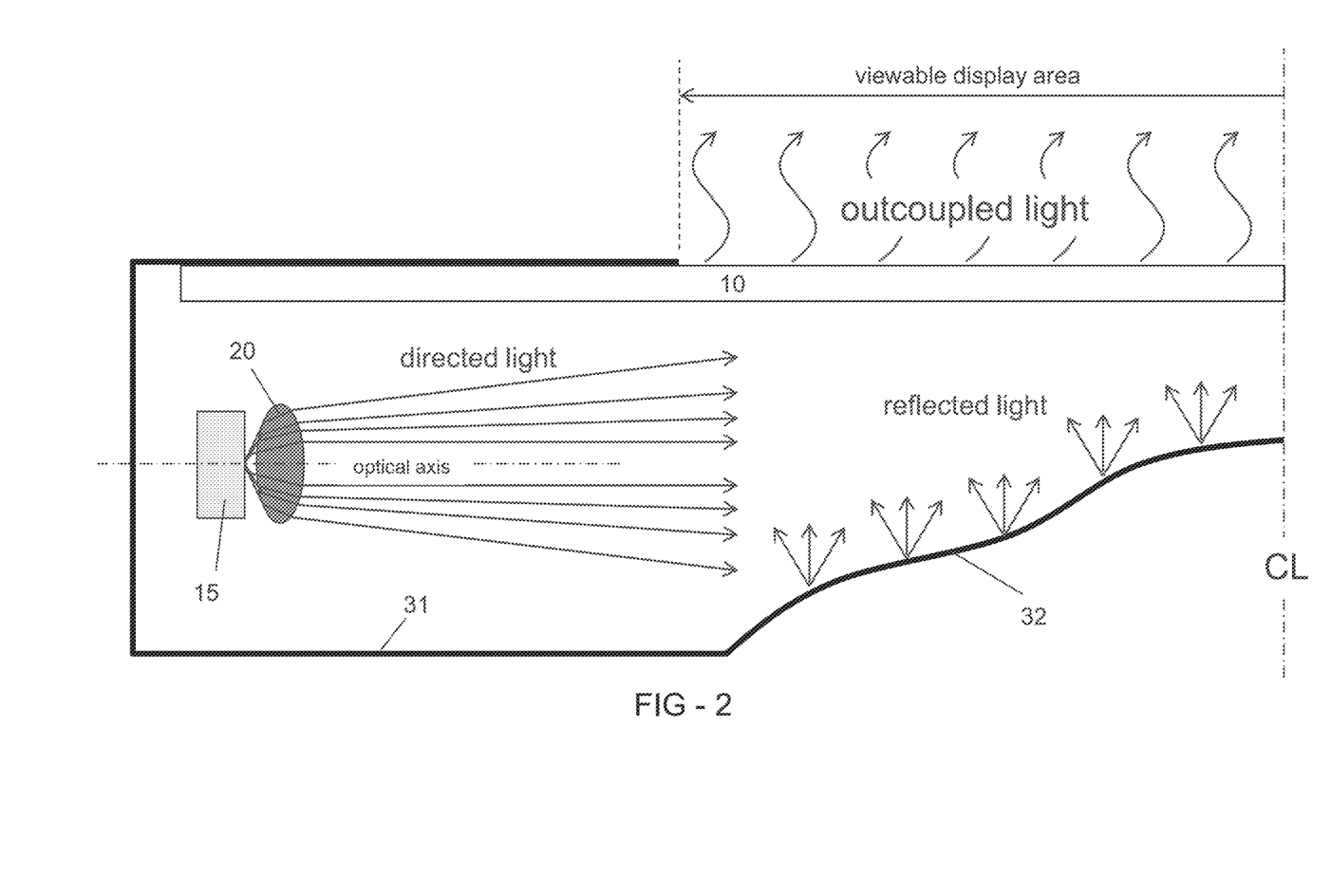
FIG. 2 is a partial side elevation view of an embodiment of an airguide backlight assembly using a reflective pan having an optimized curvature.

FIG. 2 is a partial side elevation view of an embodiment of an airguide backlight assembly using a reflective pan 31 having an optimized curvature 32. An optimized curvature would generally serve to transform the distribution of light as it exits the light source 20 to the desired distribution of light over the viewing area, which is typically a uniform distribution. The distribution of light as it exits the light source at 20 is generally not uniform. Thereby, the shape of the pan 32 is designed to compensate for the nonuniformity of the light source while simultaneously and conveniently reflecting the light in a predominately outward direction through anterior element 10. Clearly, the complexity of the shape of the pan 32 depends on: 1) the nonuniformity of the light exiting the light source at 20 that must be compensated, and 2) the degree to which the desired viewing area distribution is satisfied. More specifically, the pan may intrinsically reflect more light outward where the light striking it from the light source is weaker, and vice versa. Alternatively and/or simultaneously, in areas where the light striking the pan 32 is relatively stronger the pan 32 may direct light to regions of the viewing area that would otherwise be relatively weaker. A similar effect may be obtained by varying the reflectivity of the pan 32 at different locations along the pan 32.

Clearly, there is a very large degree of optimization that is potentially possible by the shape of the pan 32. Although the shape of the pan 32 is shown as being contiguous, this is not strictly a requirement. In other words, the shape may have discontinuities such as bent edges, or even formed in discrete sections.

The surface texture of the pan 32 is another variable that can be used to optimize the distribution of light at the viewing area. A smoother texture will tend to 'specularly' reflect light like a common mirror does, while a rougher texture will 'broadcast' the light over a wider range of angles. The surface texture may also vary at different locations along the pan 32.

Figure 3:
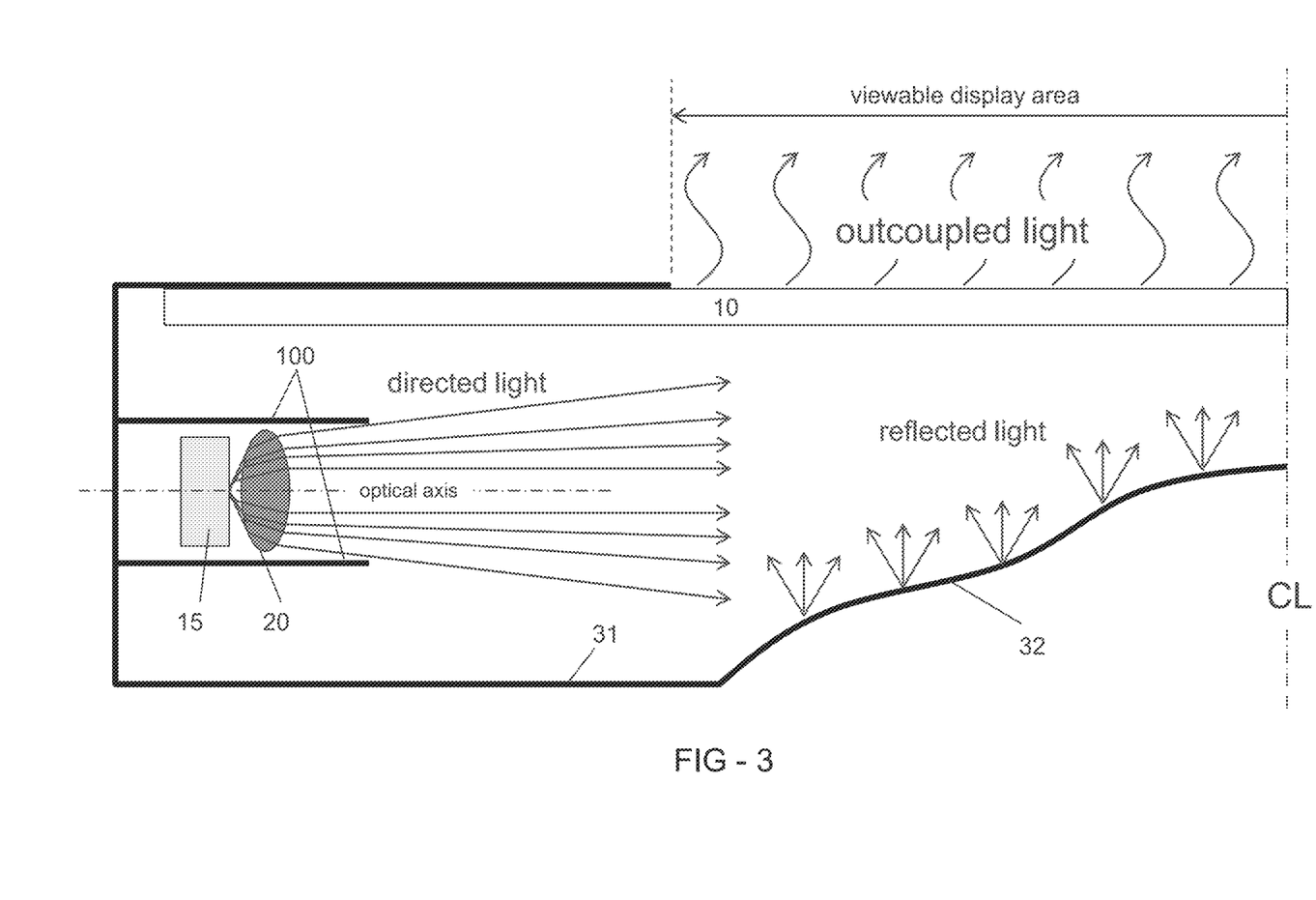
FIG. 3 is a partial side elevation view of an embodiment of an airguide backlight assembly using blinders around the light source.

FIG. 3 is a partial side elevation view of an embodiment of an airguide backlight assembly using blinders 100 around the light source 15. The blinders 100 are preferably placed above and below the light source 15 and lens 20. In other words, a top blinder may be positioned between the anterior element 10 and the light source 15 while a bottom blinder may be positioned between the pan 31 and the light source 15. The blinders 100 may have any value of reflectivity, from 0-100%, which serves to aid in the desired distribution of light at the viewing area. A preferred use of blinders 100 is to selectively control stray light as it exits the light source at 20.

Figure 4:
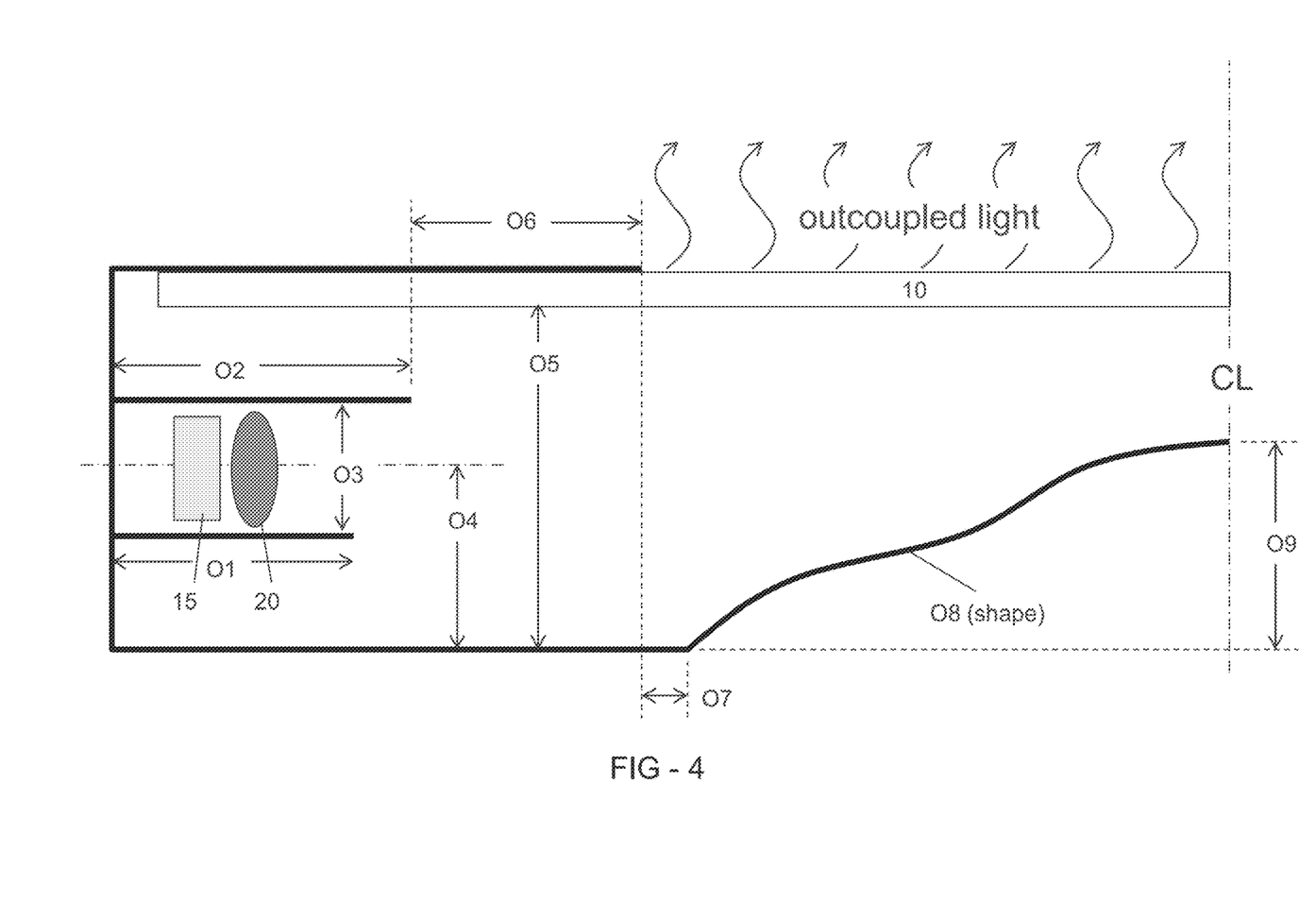
FIG. 4 is a partial side elevation view of an embodiment of an airguide backlight assembly showing the variables in the design which can be used for optimization.

FIG. 4 is a partial side elevation view of an embodiment of an airguide backlight assembly showing the variables in the design which can be used for optimization.

Figure 5:
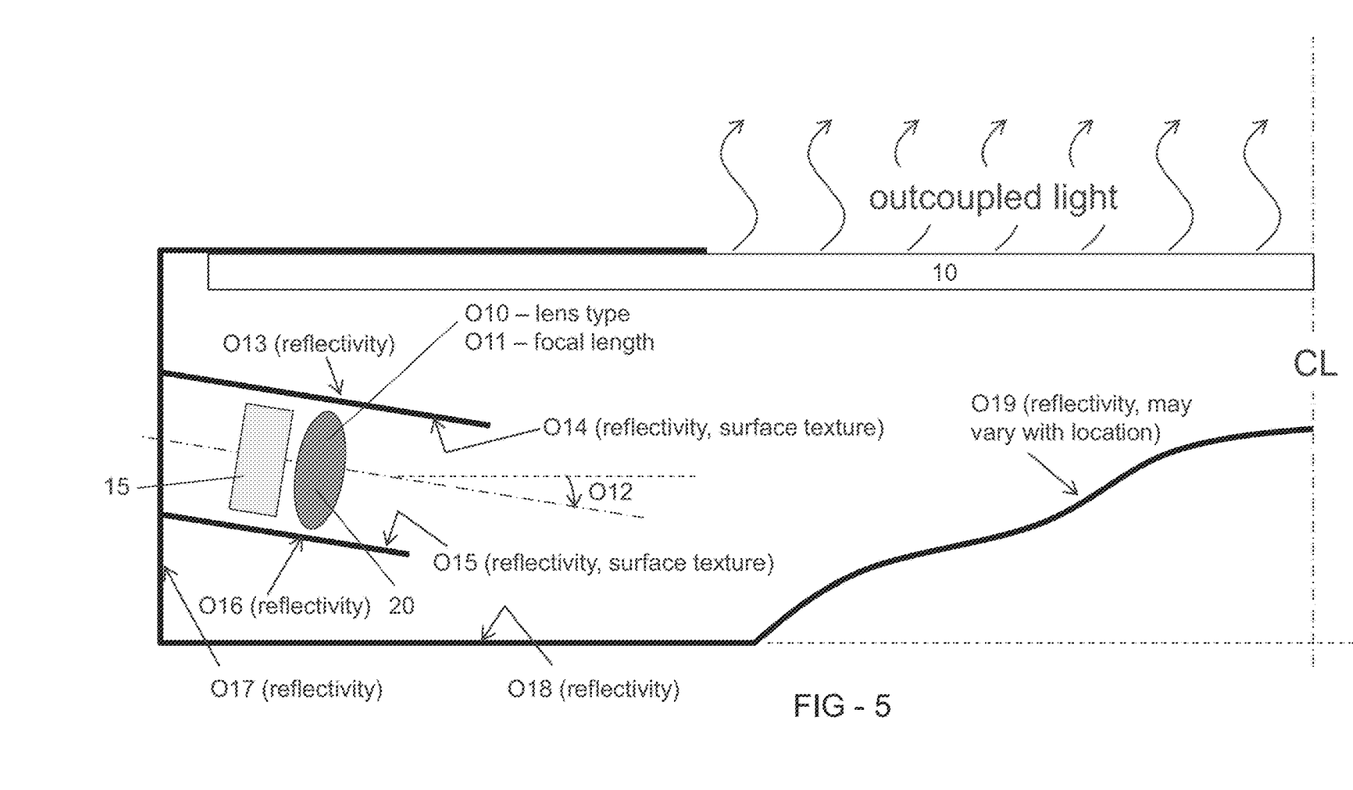
FIG. 5 is a partial side elevation view of an embodiment of an airguide backlight assembly showing further variables in the design, including a light source having its optical axis positioned at an angle relative to the display.

FIG. 5 is a partial side elevation view of an embodiment of an airguide backlight assembly showing further variables in the design, including a light source 15 having its optical axis positioned at an angle relative to the anterior element 10.

Figure 6:
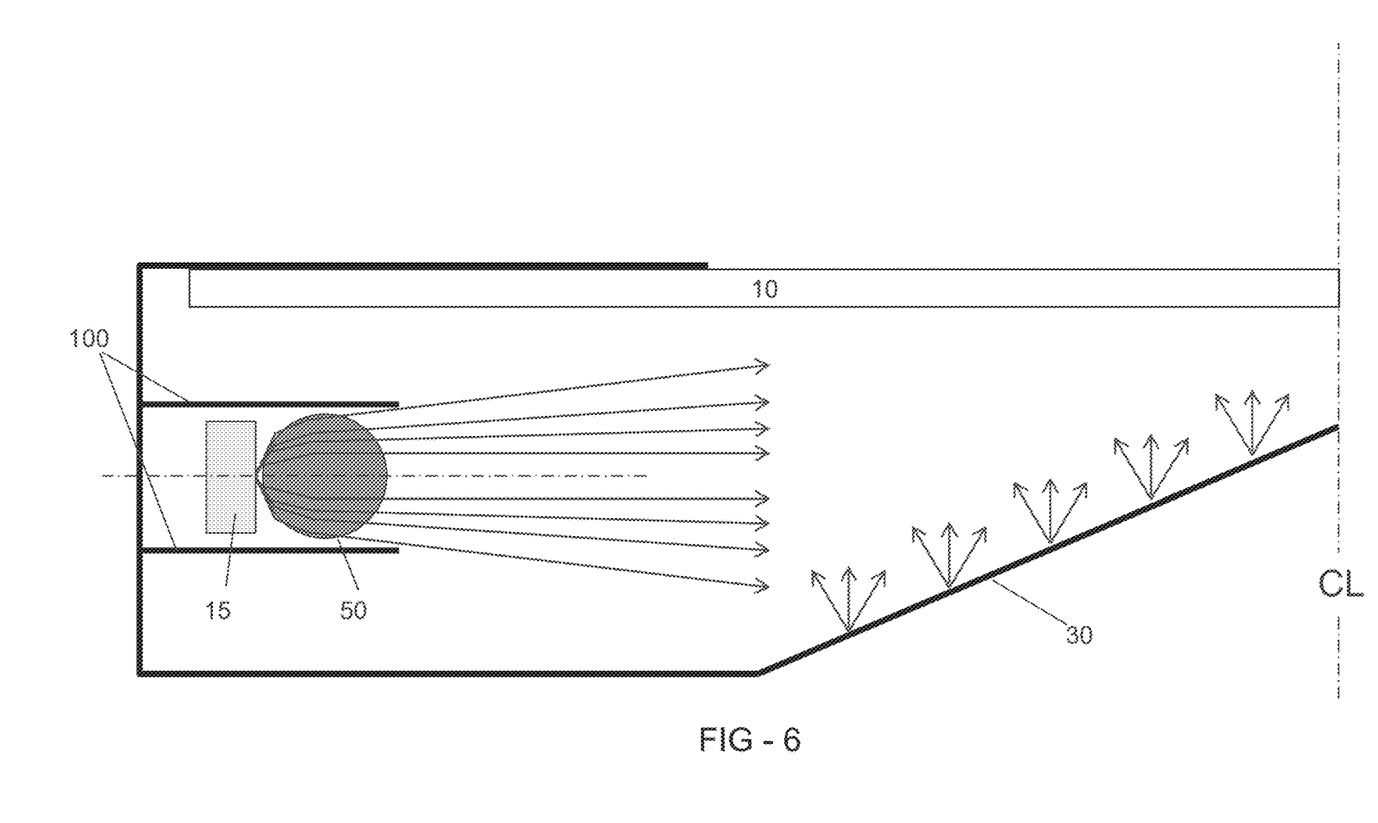
FIG. 6 is a partial side elevation view of an embodiment of an airguide backlight assembly using a ramped reflective pan and a rod lens.

FIG. 6 is a partial side elevation view of an embodiment of an airguide backlight assembly using a simple ramped reflective pan 30 and a simple rod that serves as the lens 50. This embodiment illustrates, by way of example, the invention in perhaps its most simplistic form.

Figure 7:
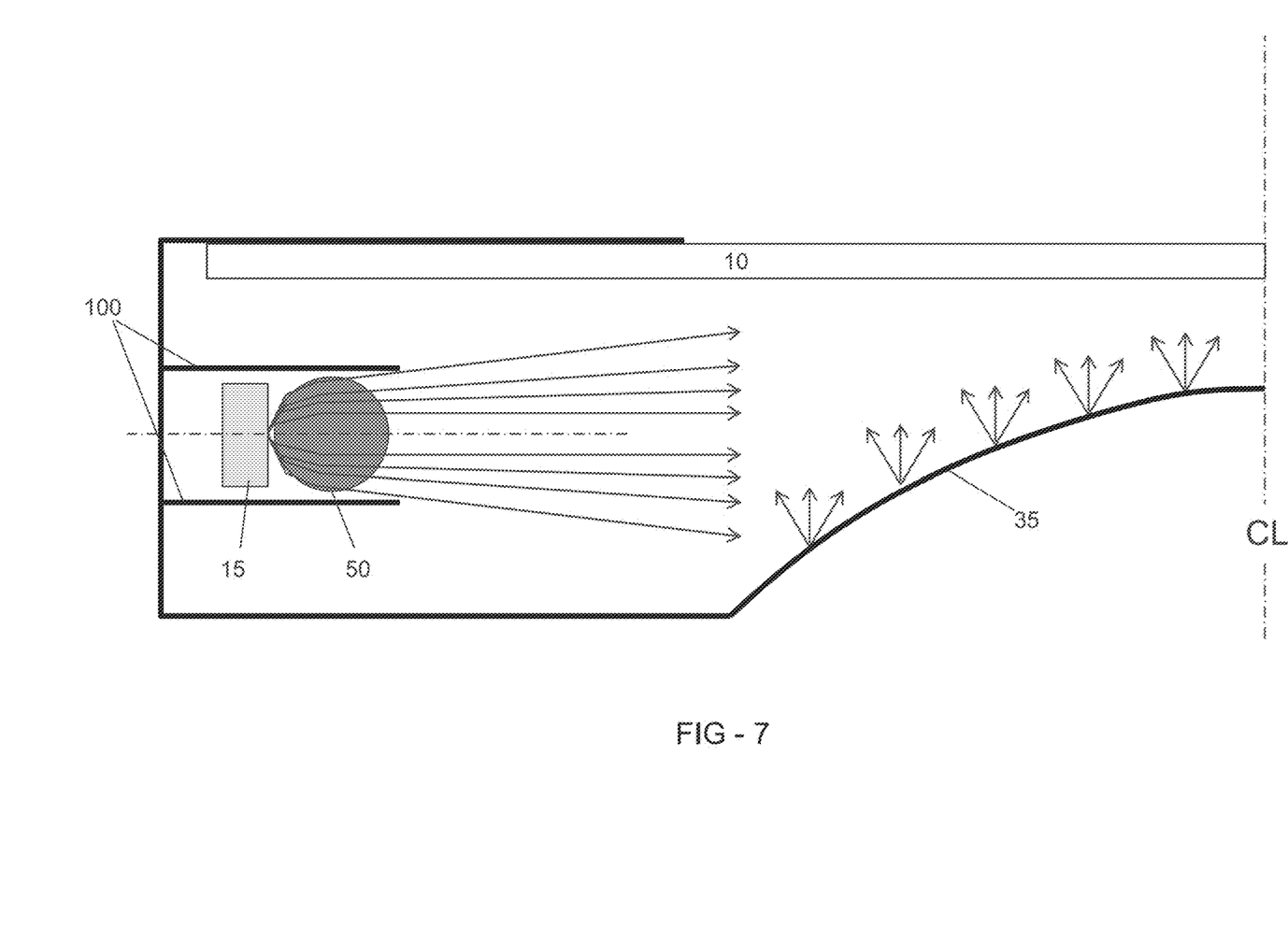
FIG. 7 is a partial side elevation view of an embodiment of an airguide backlight assembly using a cylindrical reflective pan and a rod lens.

FIG. 7 is a partial side elevation view of an embodiment of an airguide backlight assembly using a cylindrical reflective pan 35 and a rod lens 50.

Figure 8:
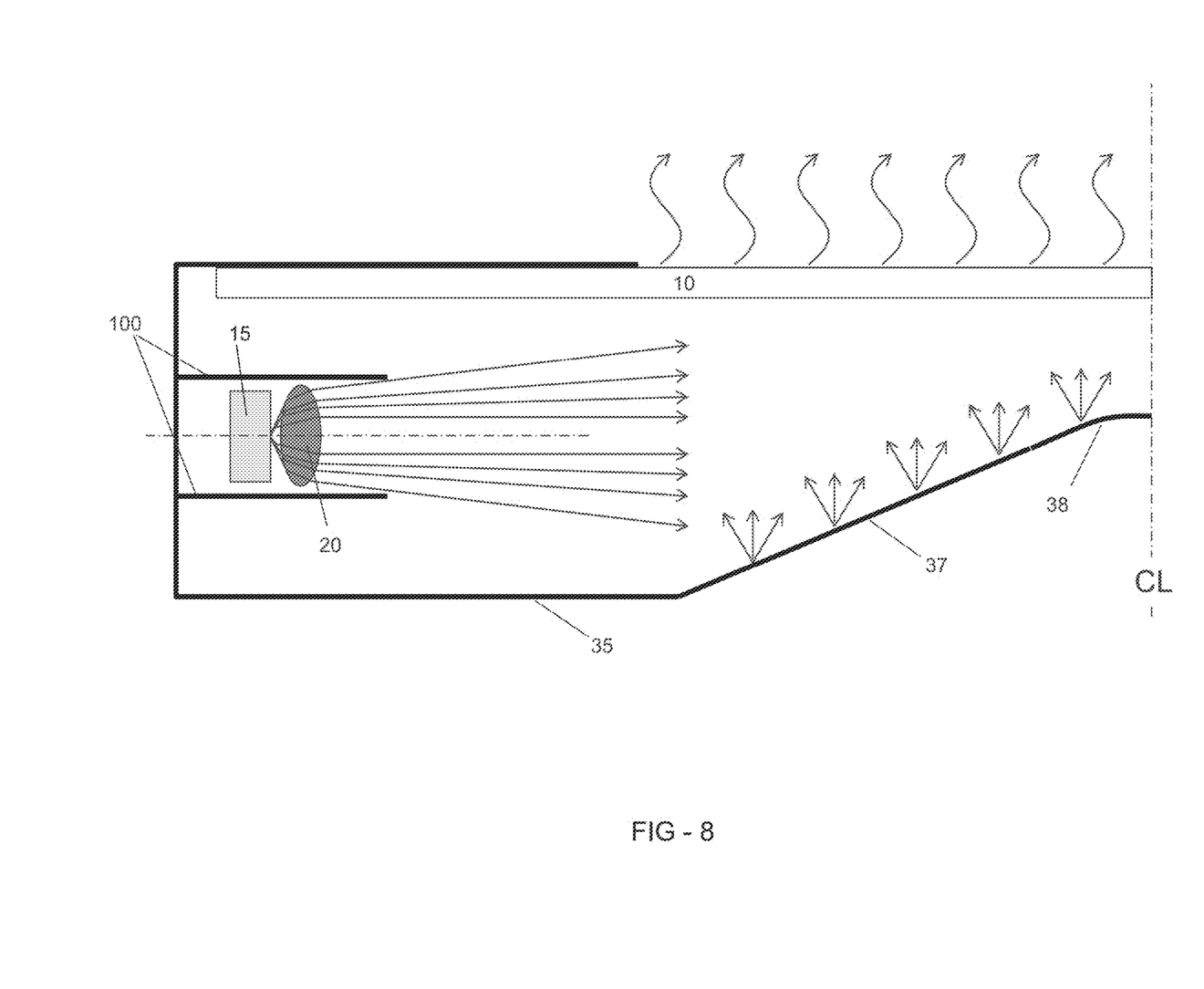
FIG. 8 is a partial side elevation view of an embodiment of an airguide backlight assembly using a hybrid curved ramped reflective pan.

FIG. 8 is a partial side elevation view of an embodiment of an airguide backlight assembly using a hybrid curved ramped reflective pan 36, which begins with a ramp section 37 and transitions to a curved section 38 as you approach the centerline of the backlight assembly.

Figure 9:
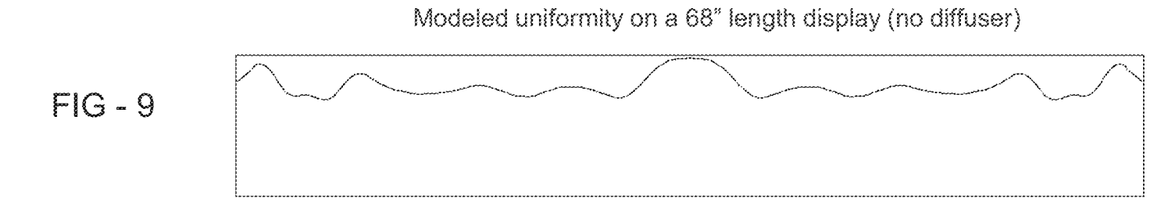
FIG. 9 is an illustration of the light distribution generated by the embodiment shown in FIG. 6.

FIG. 9 is an illustration of the light distribution generated by the embodiment shown in FIG. 6. This illustration was produced using light modeling software ASAP, which is available from Breault Research Organization. This simulation was performed with no diffuser placed into the model.

Figure 10:
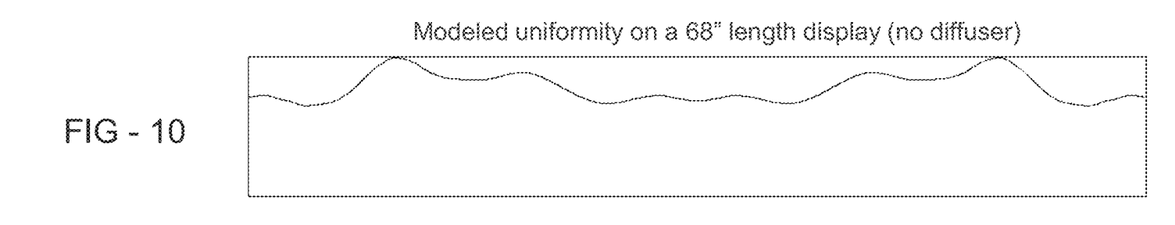
FIG. 10 is an illustration of the light distribution generated by the embodiment shown in FIG. 7.

FIG. 10 is an illustration of the light distribution generated by the embodiment shown in FIG. 7. This simulation was performed with no diffuser placed into the model.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. An airguide backlight assembly comprising:
    an anterior element comprised of a layer of liquid crystal cells;
    a reflective pan spaced apart from and positioned posterior to the anterior element, said reflective pan having a front surface positioned to faces a rear surface of the anterior element and a centerline, wherein the front surface comprises:
        at least two convex portions on each side of the centerline such that the reflective pan contains a total of four or more convex portions; and
        at least one concave portion on each side of the centerline, such that the reflective pan comprises a total of two or more concave portions;

wherein each of the concave portions are located between the at least two convex portions on a respective side of the centerline;

wherein the convex portions and the concave portions are comprised of a reflective material; and a light source positioned to direct light towards the reflective pan.

2. The airguide backlight assembly of claim 1, further comprising:

a lens placed adjacent to the light source.

3. The airguide backlight assembly of claim 1, wherein:

the reflective pan has a center portion which is closer to the anterior element than the remaining portions of the reflective pan; and the space between the reflective pan and the anterior element continually decreases, or remains equidistant for a distance, from a perimeter portion of the reflective pan to the center portion.

4. The airguide backlight assembly of claim 1, further comprising:

a first blinder placed between the light source and the anterior element; and a second blinder placed between the reflective pan and the light source.

5. The airguide backlight assembly of claim 1, wherein: the reflective pan has a textured surface facing the anterior element.

6. The airguide backlight assembly of claim 2, wherein: the lens is a transparent rod.

7. The airguide backlight assembly of claim 4, wherein: the first and second blinders extend past the lens.

8. The airguide backlight assembly of claim 4, wherein; the first blinder is longer than the second blinder.

9. The airguide backlight assembly of claim 1, wherein: the anterior element is further comprised of a diffusing element.

10. An airguide backlight assembly comprising:

an anterior element having a first and second opposing edge and a centerline, the anterior element comprising a liquid crystal layer;

a first plurality of light sources placed along the first opposing edge;

a second plurality of light sources placed along the second opposing edge;

a lens element placed in front of each light source; and a reflective pan spaced apart from and positioned posterior to the anterior element, wherein the distance from the anterior element to the reflective pan varies across the reflective pan, is the smallest when measured along the centerline, and continually increases, or remains equidistant for a distance, from the centerline towards each of the pair of opposing edges;

wherein the reflective pan comprises both convex and concave surfaces on both sides of the centerline such that the reflective pan comprises a total of two or more convex portions and two or more concave portions, wherein the entire surface of the concave portions and the convex portions are reflective.

11. The airguide backlight assembly of claim 10, further comprising:

a first blinder placed between the light source and the anterior element; and a second blinder placed between the reflective pan and the light source.

12. The airguide backlight assembly of claim 10, wherein: the anterior element contains a static graphic.

13. The airguide backlight assembly of claim 10, wherein: the light sources have an optical axis that is substantially parallel to the anterior element.

14. The airguide backlight assembly of claim 10, wherein: the light sources have an optical axis that is angled away from the anterior element and towards the reflective pan.

15. The airguide backlight assembly of claim 12, wherein: the first and second blinders extend past the lens.

16. An airguide backlight assembly comprising:

an anterior element having a rear surface, a pair of opposing edges, and a centerline, the anterior element comprising a layer of liquid crystals;

a first plurality of light sources placed along one of the opposing edges;

a second plurality of light sources placed along the opposite opposing edge as the first plurality of light sources;

a lens element placed in front of each light source;

a reflective pan positioned posterior to the anterior element and having a front surface which faces the rear surface of the anterior element;

at least two convex portions on both sides of the centerline such that the reflective pan comprises a total of four or more convex portions; and at least one concave portion on both sides of the centerline such that the reflective pan comprises a total of two or more concave portions;

wherein the concave portion on each side of the centerline is located between the at least two convex portions on the respective side of the centerline;

wherein the front surface of the reflective pan is continually inclined towards, or extends equidistant for a distance with, the rear surface of the anterior element from each of the opposing edges towards the centerline.

17. The airguide backlight assembly of claim 16, wherein:

a center gap (CG) is defined as the distance from the reflective pan to the rear surface of the anterior element when measured along the centerline and an edge gap (EG) is defined as the distance from the reflective pan to the rear surface of the anterior element when measured along one of the opposing edges; and the CG is 60%-90% of the EG.

18. The airguide backlight assembly of claim 16, further comprising:

a first blinder placed between the first plurality of light sources and the anterior element; and a second blinder placed between the reflective pan and the first plurality of light sources.

19. The airguide backlight assembly of claim 18, wherein the first and second blinders extend past the lens.

20. The airguide backlight assembly of claim 18, wherein the first blinder is longer than the second blinder.

* * * * *